United States Patent [19]

Benz et al.

[11] Patent Number: 4,830,873

[45] Date of Patent: May 16, 1989

[54] PROCESS FOR APPLYING A THIN, TRANSPARENT LAYER ONTO THE SURFACE OF OPTICAL ELEMENTS

[75] Inventors: Gerhard Benz, Böblingen; Gerda Mutschler, Gerlingen; Günter Schneider, Tamm, all of Fed. Rep. of Germany

[73] Assignee: Robert Bosch GmbH, Stuttgart, Fed. Rep. of Germany

[21] Appl. No.: 802,010

[22] PCT Filed: Mar. 12, 1985

[86] PCT No.: PCT/DE85/00079

§ 371 Date: Nov. 7, 1985

§ 102(e) Date: Nov. 7, 1985

[87] PCT Pub. No.: WO85/04601

PCT Pub. Date: Oct. 24, 1985

[30] Foreign Application Priority Data

Apr. 6, 1984 [DE] Fed. Rep. of Germany ....... 3413019

[51] Int. Cl.[4] .............................................. B05D 3/06
[52] U.S. Cl. ........................................ 427/35; 427/40; 427/164; 427/166; 427/255.2; 427/255.3
[58] Field of Search ..................... 427/164, 166, 255.1, 427/255.2, 255.3, 255.6, 35, 38, 41, 40, 44, 248.1

[56] References Cited

U.S. PATENT DOCUMENTS 3,485,666 12/1969 Sterling et al. .................... 427/255.2
4,085,248 4/1978 Zehender et al. .................... 427/35
4,096,315 6/1978 Kubacki ............................. 427/164

OTHER PUBLICATIONS

Chen et al, "Preliminary Experiment of Surface Hardening of Polymers by Glow Discharge Polymerization", J. of App. Sci., vol. 27, pp. 4655–4660, 1982.
"Polymer Sci", (USSR), 9, 2281 (1967).
"NASA Tech Briefs", Winter 1978, p. 543.
"Applied Optics", 16, 717 (1977).
"Solar Energy Materials", 3, 301 (1980).

Primary Examiner—Sadie L. Childs
Attorney, Agent, or Firm—Michael J. Striker

[57] ABSTRACT

In a process for applying a thin, transparent layer onto the surface of optical plastic elements for protecting the surface of such elements against mechanical and chemical influences that surface is subjected to a monomeric vapor of organic compositions, preferably a silicon-organic substance in a vacuum container and a protection layer is separated from the vapor phase with the assistance of the radiation from an electrical gas discharge. Substances, in particular oxygen are added to the monomeric vapor during the polymerization which increases the layer hardness. The addition of these substances is performed with a delay with respect to the start of the polymerization process, so as to assume a good adherence of the layer on the surface.

11 Claims, 3 Drawing Sheets

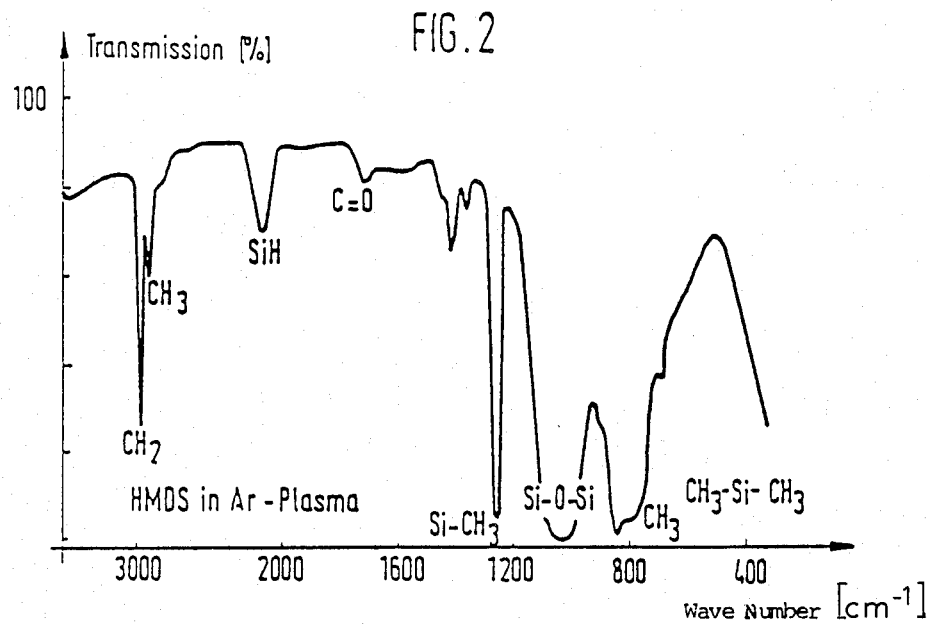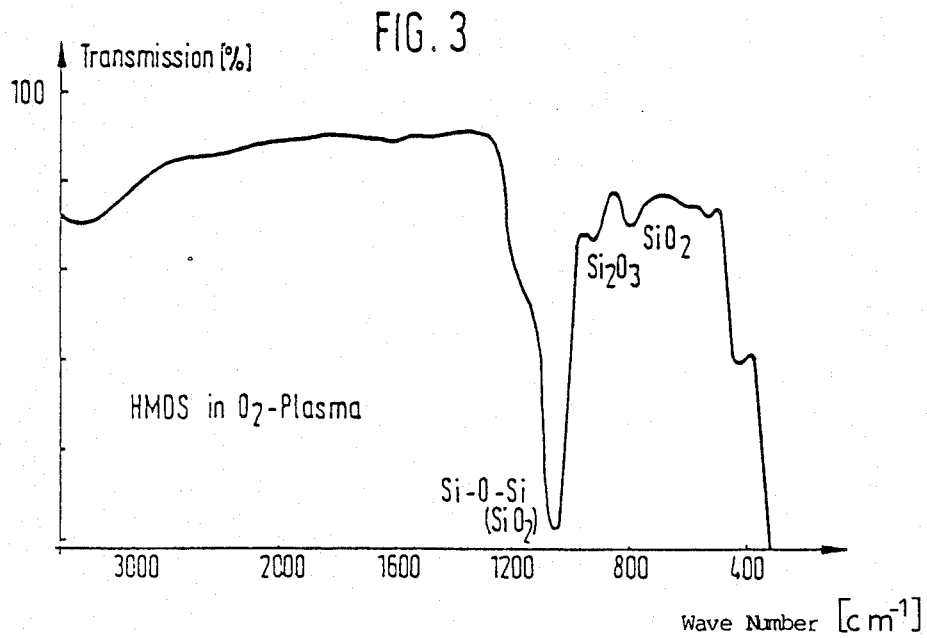

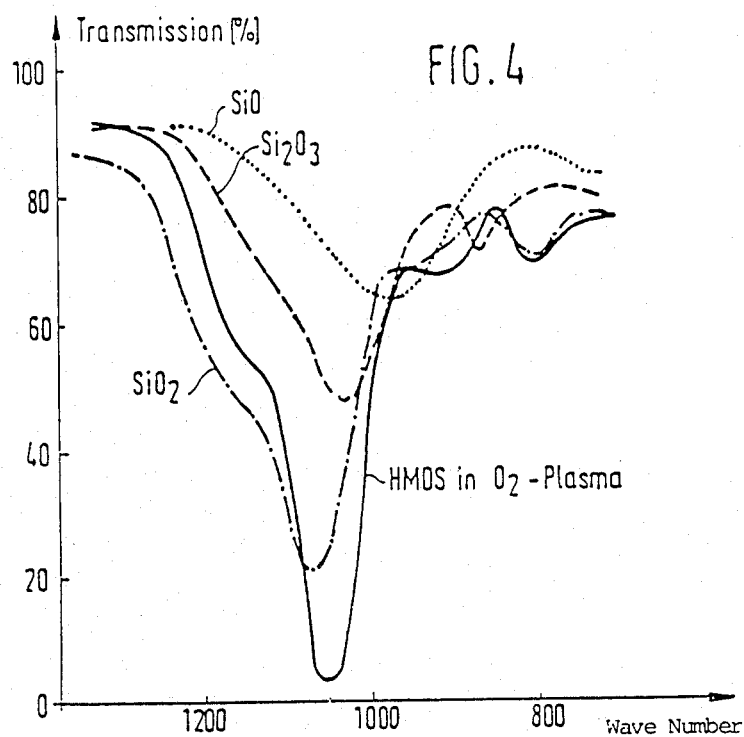
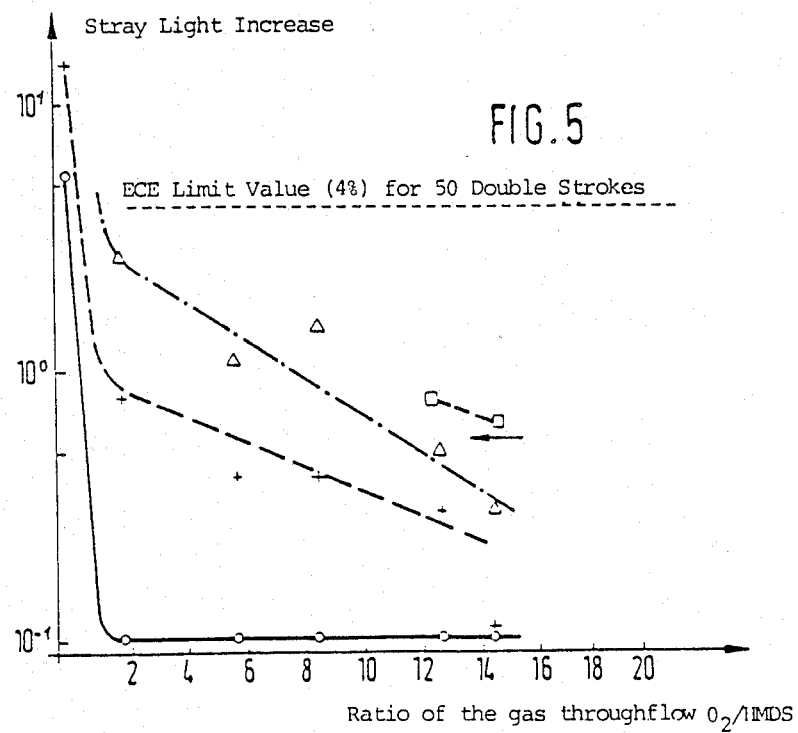

PROCESS FOR APPLYING A THIN, TRANSPARENT LAYER ONTO THE SURFACE OF OPTICAL ELEMENTS

BACKGROUND OF THE INVENTION

The invention relates a process for applying a thin protective layer to the surface of optical plastic elements. Transparent plastic elements, which are in partifcular discussed here, can be shaped with a substantially less operating expense and with a substantially higher optical precision than corresponding glass elements. For example, it is possible to make plastic lenses for simple objectives or for spectacles in an economical manner by means of an injection molding process, whereby the aftertreatment of grinding and straight-line lapping, which is required with glass lenses, is eliminated. A further advantage consists in that more complex shapes with integrated additional functions can be made. For example, the cover for the main head lights and the blinking light of a motor vehicle can be made from one piece. It is disadvantageous in all plastic materials that the soft ductile material is subjected to a very great cutting wear, which is to be understood to mean in particular the erosion due to wear and tear with a predominant tangential component, for example, wiping off. Therefore, the surface must be protected by a well adhering, sufficiently hard cover layer which withstands in addition to the climate tests (ruling cutting and the tearing off of a standard splicing tape before and after the wet room test in accordance with SK (condensed water constant climate) DIN 50017, temperature change, etc.).

Mainly lacquers with different lacquer sytems are performed for the surface protection, whereby mainly acryl lacquer and polyorganosiloxane-lacquer are used. Thereby, the polyorganosiloxane-lacquer provide the better abrasion protection in relative comparison. The test for abrasion resistancy may be performed, for example, in accordance with an ECE-suggestion (Economic Commission for Europe) in the following manner:

A die of $14 \times 14$ mm is enveloped with a cloth and abrases with a contact pressure of 2 $N/cm^2$ with a maximum speed of 3 cm/sec over the coating. A quartz powder with a Mohs-hardness of 7, grain size of 0 to 200 $\mu m$ is provied between the test face and the die in a substantial normal distribution and a corner ratio of 1.8 to 2.0. After 50 double strokes the stray light is measured in transmission in a space angle of 1° to 12°. A stray light value of 4% is provided as a maximum upper limit value in the ECE-standard suggestion. However, after this test the acryl lacquers have stray light values of more than 5% and the best polyorganosiloxane-lacquer only somewhat smaller than 4%.

Hard layers can also be made with PVD-and CVD-processes (Physical Vapour Deposition or Chemical Vapour Deposition). The CVD-processes require relative high process temperatures. Even with plasma supported CVD-processes the necessary process temperature is still too high, even for polycarbonate parts. Moreover, very brittle inorganic cover layers are generated in such CVD-reactions, like $SiO_2$ or SiC, which do not adhere very well on the organic support and therefore chip off very often during the abrasion test. The same problem is encountered with quartz layers which are vaporized in a high vacuum (PVD-process). The hardness of such layers is very good. After the aforementioned stated ECE-abrasion test one can realize stray light values of smaller than 1%. However, in these layers the adherence on polycarbonate is very poor after a temperature change or temperature storage.

Furthermore, it is known that protective layers can be made by means of the glow polymer process Different silanes, siloxanes and silazanes are used as initial monomers. The polymer films which are separated in a glow discharge from these silicon organic compositions are relatively soft without any additional measures and do not offer any noticeable abrasion protection. However, the layer hardness increases when the number of the silicon-hydrogen-silicon compositions which are present in the polymer film is increased. This can be achieved in accordance with "Polymer Sci" (USSR) 9, 2281 (1967), for example, by adding argon-inert gas into a glow discharge which burns in a siloxane-monomer vapor, whereby hexamethyl disiloxane (HMDS) is used as a monomer.

In the "NASA Tech Briefs", Winter 1978, p.543 a similar process for making scratch proof layers on lenses made from PMMA is stated. Thereby, in accordance with the statements by the author an adhering support is made on the plastic surface in a first step by a treatment in a steam vapor-plasma by forming of hydroxyl-groups. In a second step the actual polymer film is applied made of a silicon organic monomer (in the example even parts of vinyl dimethyl ethoxysilane and hexamethyl disilicane). The most important third step in this context is the aftertreatment in an argon plasma. Thereby, in accordance with the statement by the author the netting of the polymer film is improved and its scratch resistance is increased.

The U.S. Pat. No. 4,085,248 describes a process for making lyophilic protective layers on the surface of optical reflectors. The lyophilisation of the polymer film which is formed from the silicon organic monomer hexamethyl disiloxane (HMDS) is achieved by an aftertreatment in an oxygen plasma. Thereby, more silicon-oxygen-silicon compositions are generated in the proximity of the surface areas of the polymer film. The increased limit tension which is obtained should also effect an improvement of the scratch resistance. This was already noted in a treatise in "Applied Optics" 16, 717 (1977), whereby a certain improvement of the abrasion resistancy was achieved by means of an aftertreatment of a polymer film, which was made from a silicon organic monomer (vinyl trimethoxysilane), in an oxygen plasma. However, the protective effect for a polycarbonate face which is achieved therewith is not sufficient to pass the aforementioned ECE-test. Our own tests have shown that the resistance against scratching of layers which were after-glowed in oxygen HMDS-layers were clearly poorer during the ECE-test than the one of the nontreated layers of a corresponding layer thickness.

In "Solar Energy Materials", 3, 301 (1980) it is suggested to introduce a certain component of oxygen into the monomer vapor during the separation of the polymer film for improving the scratch resistance. Thereby, the oxygen partial pressure is smaller than the partial pressure of the monomeric evaporation. The number of the silicon-oxygen-silicon-compositions are increased in accordance with the publicised infrared spectrum, as is the case in the already discussed processes, and thereby also the layer hardness. However, despite the addition of oxygen the concentration of the methyl groups, which give an organic soft character to the polymer film, remain practically unchanged. Also, the sand falling abrasion method which is used in accordance with ASTM D 968-51 is a less stringent test method than the abrasion test by the ECE as aforementioned. Furthermore, in the cited treatise glass supports were used as a carrier substance for the layer to be applied, so that the problem of the layer adhering on a plastic substance has not to be considered.

SUMMARY OF THE INVENTION

It had been shown that a layer made in accordance with the process stated in the characterizing clause of the main claim does not only permanently withstand chemical and thermically influences, but also has a good abrasion and scratching resistancy. Thus, it offers an optical protection for the surface of optical plastic elements, in particular plastic material elements. The process is so performed that a soft, plastic like polymer layer is separated from the monomer steam of the organic compositions which have a good adhering capability on the support. A layer hardening substance is added during the layer growth to the monomer steam, for example, oxygen in a defined amount and over a defined period of time, whereby the organic polymer layer (adhering layer) assumes a more inorganic quartz like character. The protective layer which is obtained in this manner is very hard and very resistant against scratches. In addition to the preferred used hexamethyl disiloxane other methyl, -vinyl-, phenyl-, or alkoxy group containing siloxane, silazane or silane for forming the protective layer.

Advantageous further embodiments and improvements of the process stated in the main claim are made possible by the measures which are stated in the subclaims. The nature of the protective layer can be varied at will by the amount of the ged hardness increasing substances during the layer growth. A particularly hard cover layer is obtained by adding of oxygen in such a manner that the oxygen partial pressure is constantly increased during 5 to 20% of the total separation and that the throughflow ratio of oxygen and monomer is increased to values from 3:1 and 20:1, in particular between 8:1 and 16:1, at an operating pressure of $5 \times 10^{-2}$ to 1 mb.

BRIEF DESCRIPTION OF THE DRAWINGS

FIG. 2 illustrates the infrared spectrum of a HMDS-glowing layer, FIG. 3 is the infrared spectrum of an HMDS-layer in an oxygen plasma, FIG. 4 is a comparison of the infrared absorption band of four differently made samples, FIG. 5 is a diagram of the increase in stray light in accordance with the RCE abrasive test.

DETAILED DESCRIPTION OF THE PREFERRED EMBODIMENTS

Figure 1:
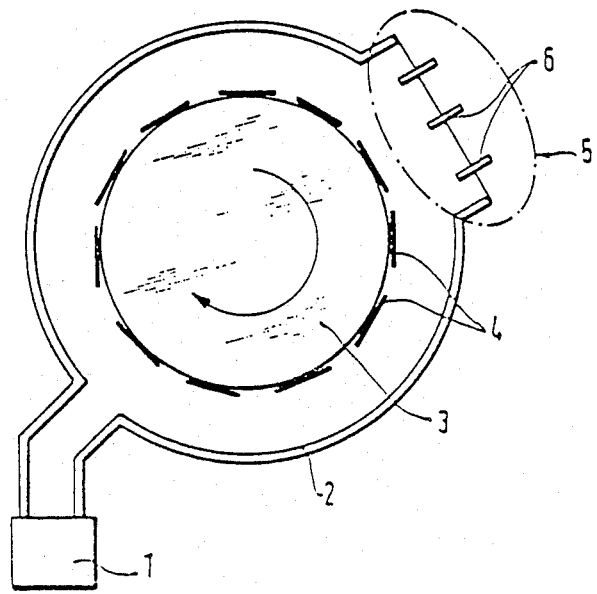
FIG. 1 illustrates a cross sectional view through a schematically illustrated device for making the novel protective layer.

In a vacuum container 2, which is evacuated by a pump 1, a drum 3 is provided which is rotatable around its axis and on the circumferential face of which the plastic parts 4 to be coated are mounted. The parts 4 to be coated pass in a timely manner one by one a coating unit 5 which preferably is mounted on the outer side of the vacuum container 2. The coating unit 5 consists of a plurality of single jets 6 into which reaction gases are fed and which are mounted along a jacket line within a circumferential sector of the container 2.

The reaction gases employed are fed through the jets 6, namely a silicon organic monomer (methyl, -vinyl-, phenyl- or alkoxy group containing silane, siloxane or silazane), preferably HMDS and an additional gas, in particular oxygen into container 2. A glow discharge is ignited by a high voltage which is applied from the outside to the outflowing monomer steam or the additional gas, in a known manner. Thereby, highly stimulated ions, radical and molecule fragments are generated which are applied to the good to be coated which is located only a few centimeters therefrom and grow there into a protective layer. Thereby, a pure organic made polymer film is separated without additional gases, like oxygen, so as to achieve a good adherence of the protective coating on the good to be coated which may be a plastic substrate, like PC or PMMA.

During the operation of the process it is important that that the substrate surface made of PC or PMMA is not subjected to a glow purification in an oxygen containing plasma before the separation of the polymer film, because the coating adherence of a subsequently applied HMDS glowing polymer film would be drastically impaired.

EXAMPLE I

PC-substrate. No glow purification. Polymer coating thickness 6.5 μm. Adherence of the polymer film after 240 hours storage in a tropical climate in accordance with SK DIN 50017 (40° C. 100% relative wetness) or after 10 temperature changes between $-40°$ C. $+130°$ C. and subsequent ruling cut 100 percent.

EXAMPLE II

PC-substrate. 1 minute glow purification in oxygen plasma. Polymer coating thickness 7.5 μm. Chipping off of the coating during a slight bending of the substrate.

EXAMPLE III

PC-substrate. 1.5 minutes glow purification in oxygen plasma. Polymer coating thickness 7 μm. Spontaneous chipping off of the coating when touching with a needle.

EXAMPLE IV

PC-substrate. Glow purification 0.5 minutes in oxygen plasma and subsequently 1 minute in argon plasma. Polymer coating thickness 8.1 μm. Chipping off of the coating during the test for scratch resistancy in accordance with the aforementioned ECE-test.

During the glow polymerisation of pure HMDS with the summation formula $C_6H_{18}Si_2O$ a polymer film is generated on the plastic surface with the general summation formula $(C_2H_\beta Si_\gamma O_\gamma)_n$. This polyorganosiloxane film is lyophobic and relatively soft, but because of its organic character it adhers very well on the plastic support. Oxygen ($O_2$) may be added into the glow discharge after the formation of a pure HMDS-glow polymer film of only a few 100 nanometers. The partial oxygen pressure is constantly increased during about 5 to 20% of the total separation duration. Thereby, the ratio of the gas flows is increased from $O_2$ and HMDS to about 10:1 with an operating pressure of $5 \times 10^{-2}$ mbar to 1 mbar. Thereby, the organic methyl groups in the glow polymer coating are replaced by oxygen. Thereby, in the aforementioned summation formula the indices α and β are constantly reduced until in a very oxygen rich glow discharge a SiO$_x$-like coating is generated from the HMDS (α,β=O). This quartz like coating is very hard and very scratch resistant.

EXAMPLE V

Total separation duration 10 minutes; Total coating thickness 7 μm. The separation starts with a pure HMDS-gas with a throughflow of 50 cm$^3$/min. for a time period of 0.5 minutes. Thereafter, within 1 minute, linearily increasing from the throughflow O cm$^3$/min. to the throughflow of 500 cm$^3$/min. O$_2$-gas is additionally fed into the glow discharge. This throughflow ratio of O$_2$/HMDS=10:1 is maintained constant throughout the remaining separation duration of 8.5 minutes.

Therefore, the decisive steps in the process are, that at first an organic, soft, but well adhering polyorganosiloxane layer is separated, which in the extreme case must only be a few nanometer thick (adhering layer). The coating hardness is very much increased within a few hundred nanometer to some micrometers by adding O$_2$ up to a very clear O$_2$ surplus and can be held constant for the remaining coating profile up to the desired total coating thickness (cover thickness).

A very good adherence is achieved on the support with a simultaneous large surface hardness with the obtained stepless transition within an adjustable coating thickness from an organic polymer to an inorganic, hard cover coating.

For clarification of the described coating characteristics the FIGS. 2 and 3 illustrate the analysis in the infrared spectrometer of two differently made HMD-glow polymer layers on a common salt substrates. The coordination of the individual absorption lines with respect to the different functional groups in the polymer film can be read in the appropriate literature. In FIG. 2 a pure HMDS glow polymer layer was separated having the characteristics which are slated for the aforementioned adhering layer. For stabilizing the glow discharge argon-inert gas was additionally fed into the monomer vapor. However, this has no noticeable influence on the chemical composition of the polymer film. The absorptions at 2960 cm$^{-1}$ (CH$_2$), 2910 cm$^{-1}$ (CH$_3$) and 1245 cm$^{-1}$ (Si—CH$_3$) show that a polymeric organo siloxane film had been separated. In contrast thereto the sharp absorption lines in FIG. 3, which are caused by the methyl groups, have disappeared. Thereby, the absorption at about 1050 cm$^{-1}$ is very strongly evidenced being caused by a silicon-oxygen-silicon stretch oscillation. In FIG. 3 we operated with a throughflow ratio of O$_2$ with respect to HMDS of larger than 6:1. In addition argon-inert gas was used for the stabilisation of the glow discharge. The chemical composition of the layer in accordance with FIG. 3 corresponds therefore to the cover layer of the described scratch resistant coating.

For a further illustration FIG. 4 illustrates a comparison of the infrared absorption bands in the range of the silicon-oxygen-silicon-stretch oscillation of four differently made samples. These are three evaporated layers of SiO, Si$_2$O$_3$ and SiO$_2$ and for comparison purposes the HMDS-glow polymer layer which was made with the oxygen surplus in accordance with FIG. 3. The diagram clarifies that the cover layer of the scratch resistant coating on plastic surfaces consists practically of SiO$_x$ with $1.5 < x < 2$.

The scratch resistance of the protective coating can be influenced in wide limits during the separation of the cover layer due to the ratio of the gas flows of O$_2$ and HMDS. FIG. 5 illustrates in a logarithmic dimension the stray light increase of PC samples which were coated with a 6 μm thick layer after an abrasion in accordance with the ECE-test. Thereby, the ratio of the gas flows of O$_2$ and HMDS was varied between 0:1 and about 15:1 with an operating pressure of about $3 \times 10^{-1}$ mbar and the stray light increase was measured after 50, 100, 200 and 500 double strokes of the abrasion die in accordance with the ECE-test with respect to a non-scratched sample. The quartz powder used was renewed after 50 double strokes.

FIG. 5 illustrates that the stray light value after 50 double strokes with the measured 5.5% is above the maximum value of 4% as suggested by the ECE- suggestion without an oxygen component in the HMDS-plasma. In O$_2$ afterglowed samples the stray light value is above 7%. However, at a ratio of the gas flows from O$_2$ to HMDS of 2:1, the stray light increase is within the range of 0.1% and thereby far below the ECE-limit value of 4% with 50 double strokes (O-symbols in FIG. 5 and drawn out curve). In particular the the measuring curves after 100 or 200 double strokes illustrate that the stray light values further decrease with an increase of the ration of the gas flows O$_2$ to HMDS, i.e., the abrasion resistance of the protective layer increases (+-symbols and dotted curve or Δ-symbols and dash-dotted curves). The measuring points at 500 double strokes (□-symbols) result in a stray light increase of 0.7 to 0.8% at a O$_2$: HMDS gas flow ratio of 14:1. A soft glass sample which had been tested in the same manner with a 0.6% stray light increase (arrow symbol in FIG. 5 has a comparable scratch resistancy as the coated PC-plates. This result demonstrates the very good scratching protection which is obtained by the described process.

In addition to the aforementioned reaction of silicon-organic monomers with oxygen which finally results in the formation of hard SiO$_x$- cover layers, one can also form SiC-like or Si$_3$N$_4$-like cover layers with corresponding temperature resistant substrates for obtaining a further increase of the layer hardness, in that pure hydrocarbons or nitrogen or nitrogen containing compositions, preferably N$_2$ and NH$_3$ are fed into the reaction in addition to the oxygen gas flow or instead of the same, if need be. The low molecular compounds of the alkanes (for example, methane, ethane etc.) of the olefines (ethylene) or the alkyne (for example, acetylene) are particularly suitable hydrocarbons.

The suggested process is not only important for making protective layers on the surface of optical plastic elements. Moreover, optical glass elements may be coated in this manner and therefore hardened. Furthermore, the suggested process for making a protective layer on the surface of reflectors, preferably aluminum vaporized reflectors. Thereby, due to the addition of oxygen during the polymerisation the effect described in the U.S. Pat. No. 4,085,248 occurs, i.e., the originally lyophobic monomer of the layer is lyophilized by the oxygen treatment and therefore assumes the characteristics of the aforementioned publication. Since the oxygen treatment does not occur after the layer had been applied, but already starts during the polymerisation, the liophilisation is considerably lasting and more durable, since it also engages deeper located areas of the protective layer. It had been shown that the lyophilic characteristics of the layer which were generated by the aftertreatment with oxygen disapper more and more if the open coated reflectors are stored for a longer period of time. A protective layer which is made in accordance with the suggested process is substantially more resistant with respect to its lyophilic characteristic and does not show any loss in efficiency even after a relatively long time of storage of the reflectors.

We claim:

1. In a process for applying a thin, transparent layer onto the surface of transparent plastic elements in a vacuum container for protection against mechanical and chemical influences, comprising the steps of applying onto the surface of the plastic elements a monomeric vapor of organic compositions, and forming a protective layer from an electrical gas discharge by means of a polymerization from the vapor phase with the assistance of radiation, whereby substances are added to the monomeric vapor during the growth of the polymer layer for increasing the layer hardness, the improvement comprising that the addition of the substances which increase the layer hardness is performed with a delay with respect to the start of the polymerization process so that a mixture of the monomeric vapor and said substances between the start of the polymerization process and a completion thereof is changed.

2. Process in accordance with claim 1, characterized in that during the polymerisation process the substances which increase the layer hardness are added in an increasing amount.

3. Process in accordance with claim 2, characterized in that the supply of the substances which increase the layer hardness is continuously increased.

4. Process in accordance with claim 1, wherein the addition of the substances which increase the layer hardness is performed after a predetermined time from the start of the polymerisation in the first half of the layer growth, and the amount of the added substances is increased up to the end of the layer growth by a multiple of the amount of the monomeric vapor.

5. Process in accordance with claim 1, characterized in that oxygen is used as the substance which increases the layer hardness.

6. Process in accordance with claim 5, characterized in that the partial oxygen process during 5 to 20% of the total separation duration is continuously increased and is increased to values of between 3:1 and 20:1, in particular between 8:1 and 16:1 with an operating pressure of $5 \times 10^{-2}$ mbar up to 1 mbar of the flowthrough ratio of oxygen and monomer.

7. Process in accordance with claim 5, characterized in that the addition of the oxygen starts after a maximum of 10% of the total separation duration and is increased to a predetermined value linearly within a maximum of 30% of the total separation duration, whereby this value remains constant during the remainder of the separation duration.

8. Process in accordance with claim 1, wherein hydrocarbons selected from the group consisting of low molecular alkanes, alkenes, alkynes, methane and acetylene are used as the substance which increases the layer hardness.

9. Process in accordance with claim 1, wherein nitrogen or nitrogen containing compositions are used as the substance which increases the layer hardness.

10. Process in accordance with claim 5, wherein said nitrogen-containing compositions are selected form the group consisting $N_2$ and $NH_3$.

11. Process in accordance with claim 1, wherein said organic composition is a silicon-organic substance.

* * * * *